Patented Aug. 19, 1924.

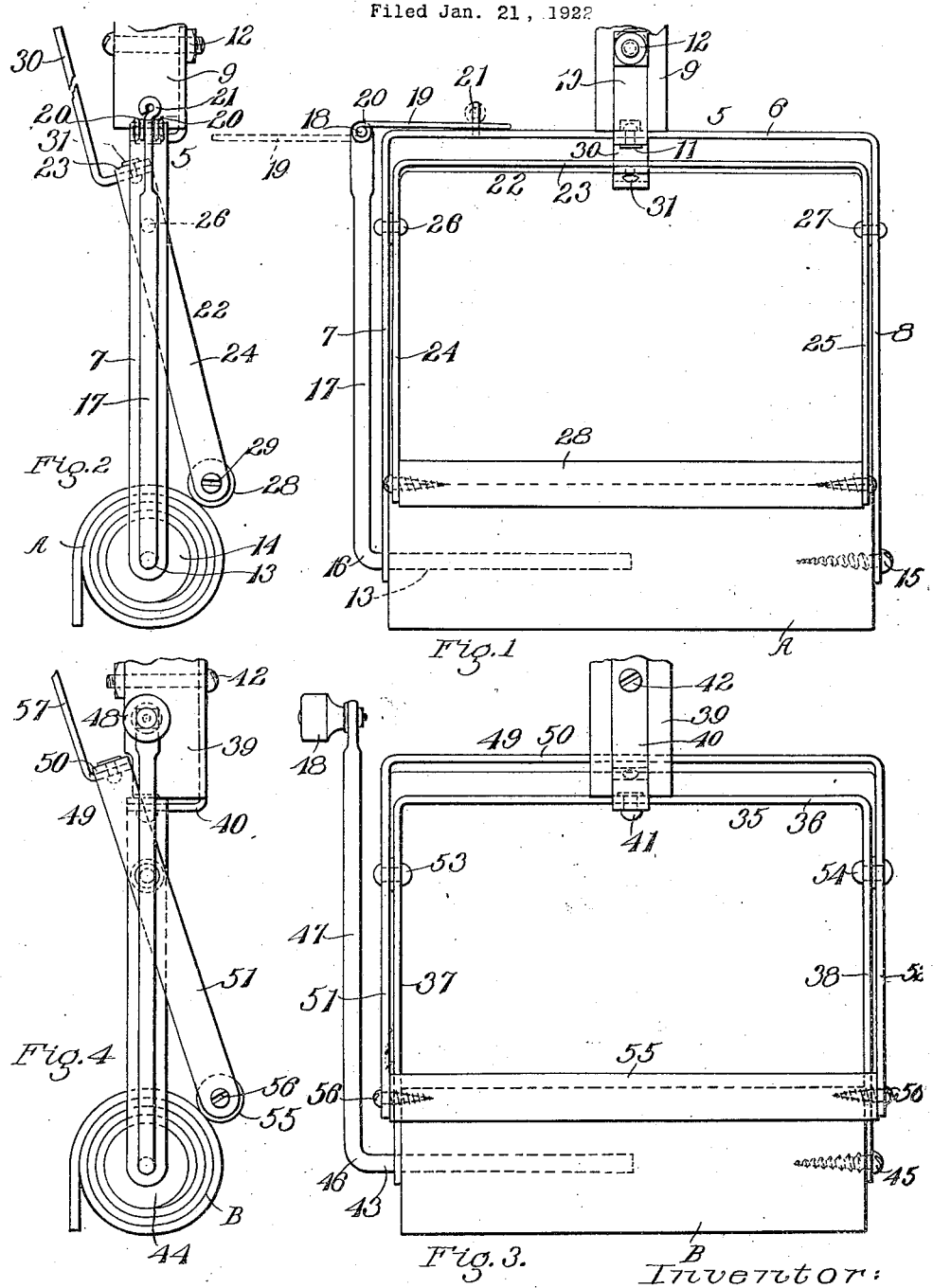

1,505,547

UNITED STATES PATENT OFFICE.

PAUL EBELING, OF BOSTON, MASSACHUSETTS.

MOP HOLDER AND WRINGER.

Application filed January 21, 1922. Serial No. 530,740.

*To all whom it may concern:*

Be it known that I, PAUL EBELING, a citizen of Germany, residing at Boston, in the county of Suffolk and State of Massachusetts, have invented new and useful improvements in Mop Holders and Wringers, of which the following is a specification.

This invention relates to a holder and wringer for mops and has for its object to provide a device having a rotatable drum to which a mop is secured and around which it may be wound, the said device also having embodied therein means co-operating with said drum to wring moisture from said mop while the latter is being wound around said drum.

The invention consists in the combination and arrangement of parts set forth in the following specification and particularly pointed out in the claim thereof.

Referring to the drawings:

Figure 1 is a front elevation of a device embodying my invention, the handle thereof being broken away to save space in the drawings.

Fig. 2 is a side elevation as viewed from the left of Fig. 1.

Fig. 3 is a front elevation of a modified embodiment of my invention, the handle thereof being broken away to save space in the drawings.

Fig. 4 is a side elevation of the device of Fig. 3 as viewed from the left thereof.

Like numerals refer to like parts throughout the several views of the drawings.

In the drawings, referring particularly to Figs. 1 and 2, 5 represents a U-shaped main frame having a central portion 6 and parallel arms 7 and 8 formed integral therewith. The frame 5 is secured to a handle 9 of any desired length by an angle bar 10 to which the frame is riveted at 11, the angle bar, in turn, being secured to the handle 9 by a bolt 12. Rotatably mounted upon the arm 7 at the outer end thereof is a crank 13 to which a drum 14 is rigidly secured in any desired manner. The drum 14 is preferably constructed of wood and is located between the arms 7 and 8 of the frame 5, and the end of said drum adjacent to the arm 8 is rotatably mounted in said arm through the medium of a screw 15 which extends through the arm 8 and into the end of the drum 14.

A mop A composed of cloth, yarn, or any other suitable material is fastened to the drum 14 in a manner to permit its being wound therearound when the drum is rotated. The crank 13 is preferably bent at 16 to form an arm 17 to the end of which is pivoted at 18 a handle 19, and when the crank 13 is rotated through the medium of the handle 19, the mop A is wound upon the drum 14 as illustrated in Fig. 2. The handle 19 is constructed of wire and bent U-shape, the ends 20 thereof being bent around the pivot 18 and when not in use as a handle at which time it occupies the position illustrated in dotted lines in Fig. 1 said handle is fastened to the central portion 6 of the main frame 5 by a fastening member 21 as illustrated in full lines in Fig. 1. The fastening member 21 is rotatably secured to the frame 5 and when it is desired to secured the handle 19, the fastening member 21 is rotated to a position as illustrated in dotted lines in Fig. 1 and the handle 19 swung thereover after which said fastening member is rotated to the position illustrated in full lines in said Fig. 1 and said handle is thereby held secured to the frame 5 and at the same time the crank 13 and drum 14 thereon are also prevented from rotating upon the arms 7 and 8 of said frame.

Mounted upon the main frame 5 is a U-shaped swinging frame 22 having a central portion 23 and parallel arms 24 and 25 formed integral therewith, the swinging frame 22 being located within the main frame 5, the arms 24 and 25 of said swinging frame being pivoted at 26 and 27 to the arms 7 and 8 respectively of said main frame.

A roller 28 is rotatably mounted at the outer end of the arms 24 and 25 through the medium of screws 29 which extend through said arms into said roller, the roller and screws rotating in unison in said arms. The roller 28 is preferably constructed of wood and is adapted to contact with the mop A as the latter is wound around the drum 14. The swinging frame 22 has a handle 30 rigidly secured to the central portion 23 thereof at 31 and said handle is grasped simultaneously with the handle 9 to rock the swinging frame 22 to force the roller 28 into engagement with the mop A.

In use, the mop A is unwound from the drum 14 and said drum is prevented from rotating by securing the handle 19 of the crank 13 to the main frame 5 through the medium of the fastening member 21. If during the use of the mop it is desired to wring moisture from the same, the handle 19 is released from the fastening member 21 and said handle is moved to its dotted position as illustrated in Fig. 1. The crank 13 is then rotated and the mop A wound therearound as illustrated in Fig. 2. During this winding operation, the roller 28 is forced against the mop A by grasping the handle 30 of the swinging frame 22, sufficient pressure being applied to said handle 30 to wring the moisture from the mop A as it is wound upon the drum 14.

In Figs. 3 and 4 another embodiment of my invention is illustrated in which 35 represents a U-shaped main frame having a central portion 36 and parallel arms 37 and 38 formed integral therewith. The frame 35 is secured to a handle 39 of any desired length by an angle bar 40 to which the frame 35 is riveted at 41, the angle bar, in turn, being secured to the handle 39 by a bolt 42. Rotatably mounted upon the arm 37 at the outer end thereof is a crank 43 to which a drum 44 is rigidly secured in any desired manner. The drum 44 is constructed of wood and is located between the arms 37 and 38 and the end of said drum adjacent to the arm 38 is rotatably mounted therein through the medium of a screw 45 which projects through said arm into said drum. The drum 44 has a mop B fastened thereto in any suitable manner. The crank 43 is bent at 46 to form an arm 47 to the end of which is secured a handle 48.

Mounted upon the main frame 35 is a U-shaped swinging frame 49 having a central portion 50 and parallel arms 51 and 52 formed integral therewith. The swinging frame 49 is mounted to swing upon the exterior of the main frame 35, the arms 51 and 52 of said swinging frame being pivoted at 53 and 54 to the arms 37 and 38 respectively of said main frame. A roller 55 is rotatably mounted upon the swinging frame 49, being secured at the outer ends of the arms 51 and 52 through the medium of screws 56. A handle 57 is rigidly secured to the swinging frame 49 and said handle is utilized in rocking the frame 51 to force the roller 55 against the mop B. The device illustrated in Figs. 3 and 4 is operated to wring moisture from the mop B in exactly the same manner as previously described in connection with the device of Figs. 1 and 2.

I claim:

A mop holder having, in combination, a main frame embodying therein a pair of parallel arms, a handle for said main frame, a crank embodying therein an arm and having a portion bent at right angles to said arm, said right angle portion being rotatably mounted upon said main frame, a handle formed of wire and pivotally attached to said crank, a cylindrical drum rigidly fastened at one end thereof to the right angle portion of said crank and having a mop attached thereto, means mounted at the other end of said drum to rotatably support said end of said drum in said main frame, a U-shaped swinging frame embodying therein a pair of parallel arms pivotally mounted upon the arms of said main frame to swing within the latter, a roller mounted upon said swinging frame and a handle for said swinging frame whereby the latter may be rocked upon said main frame to force said roller into engagement with said mop.

In testimony whereof I have hereunto set my hand in presence of two subscribing witnesses.

PAUL EBELING.

Witnesses:
FRANKLIN E. LOW,
HAZEL F. LAMUDGE.